Aug. 29, 1967   R. H. SHEPPARD   3,338,603
JOINT BETWEEN OUTPUT SHAFT AND PITMAN ARM
Filed Jan. 19, 1965

Inventor:
Richard H. Sheppard
By Henry H. Snelling
his Attorney 3,338,603
JOINT BETWEEN OUTPUT SHAFT AND
PITMAN ARM
Richard H. Sheppard, 101 Philadelphia St.,
Hanover, Pa. 17331
Filed Jan. 19, 1965, Ser. No. 429,197
2 Claims. (Cl. 287—52.08)

This application is a continuation-in-part of my pending application Ser. No. 295,642, filed July 17, 1963, and now abandoned.

The invention relates to connections between a shaft and an arm extending usually normal to the shaft, and particularly to the joint between an output shaft of a steering gear and a pitman arm carrying a ball for turning the ground wheels of a vehicle. It has for its principal object the provision of a joint of such type of exceptional strength and safety.

A further object of the invention is to provide a joint suitable for truck use where space for the steering gear is becoming more and more limited because of constant increase in truck power together with equally constant reductions in weight of the vehicle.

An accompanying object of the invention is to provide a joint which eliminates tire interference in modern compart truck tractors with snub noses, large turning radii, and great horse power, this being accomplished by eliminating the familiar washer and nut arrangement at the end of the output shaft as well as the extended threaded portion of the output shaft on which they are mounted and by substituting therefor tapered involute splines on the shaft and in the pitman arm hub and holding these parts in exceptionally firm relation by relatively small screws which do not extend outwardly beyond the pitman rod hub but which engage a conical surface on the shaft and thus wedge the splines together with great security.

Figure 2:
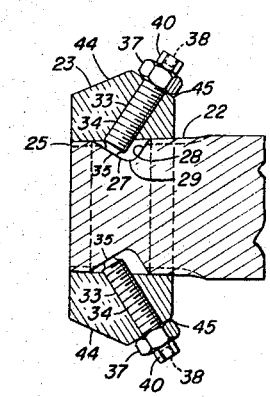
FIGURE 2 is a central section taken at right angles to that shown in FIGURE 1.

The steering gear 10 may be of any type, for example the gear illustrated which is generally similar to that shown in FIGURE 2 of my Patent 3,092,083. The actuating shaft is 11, the valve is 12, and the piston 14 is mounted in housing 15 and has rack teeth 17 meshing with a pinion 18 on output shaft 20 which differs from the ordinary type only at the left hand end. This projecting end is noticeably shorter than usual, omitting entirely the washer and nut on what is normally the threaded portion of the output shaft. In place of these elements there is a short stub portion 22 which has splines 25 fitting within similar means in the hub 23 of the pitman arm 26. Instead of being cylindrical however, the splines are of tapered involute type as shown. An involute curve is generated by a point in a taut cord as it is unwrapped from a base circle. An advantage of involute gearing is that uniform angular motion is transmitted even through the distance is changed slightly.

Teeth or splines of involute type are in common use but tapered involute splines are extremely rare although they have advantages which apparently are unknown except to the present inventor, probably due in part to the seeming difficulty of making a tapered involute spline of the tremendous advantage of the flexibility of tooling in that a considerable range of sizes with varying numbers of teeth can be made with the same basic tooling. This cannot be done with straight sided splines.

Among the unexpected advantages of the tapered involute spline connection is the stable connection it affords where heavy over-hung loads such as transmitted through a steering ball and linkage are encountered; the load sometimes falling far outside the plane of the spline.

With the connection claimed bearing can be established over the whole length of the taper on the sides of the teeth and the design claimed is not subject to Brinelling and never loosens even under the heaviest torques and under continued reversing. While not so important, disassembly is easier because less deformation is present with the tapered involute spline as only a relatively light fit is required to provide complete stability both radially and at right angles to the axis of the shaft.

The pitman arm 26 is shown as straight but where the tire comes close to any portion this arm may be bent in any way desired to take care of possible interference.

Figure 1:
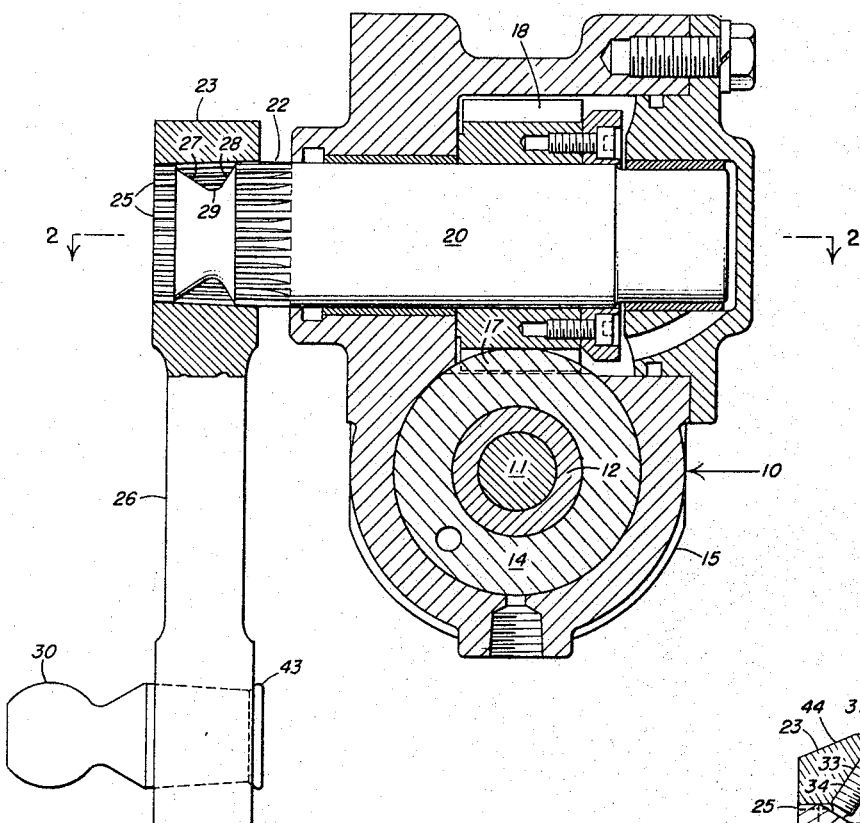
FIGURE 1 is a central section through an output shaft showing this shaft rotated by the rack driven pinion of a steering gear.

To afford the extremely firm joint which is necessary in view of the hard usage to which this connection is subjected it is necessary to make the joint substantially foolproof. To this end, the outer portion of the extension 22 is beveled as at 27 through an angle which may be anywhere from 25° to 40°, a satisfactory angle being 32½° as illustrated in FIGURE 1. This bevel forms a conical surface with its larger diameter outward. The opposite conical face 28 is approximately at right angles to conical portion 27 and merges therewith through short portion 29 which is arcuate in radial section for convenience in forming the working surface 27. The two conical portions 27 and 28 plus portion 29 form an annular V-shaped groove which is an element of means for causing relative axial movement between the pitman arm 26 and the shaft 20. As usual, the pitman arm 26 carries a ball 30 for connection to the usual drag link not shown.

Referring now to FIGURE 2 the hub 23 of the pitman arm is internally grooved to match the tapered involute splines of the output shaft. To force the splines firmly together two diametrically opposed screws 33 are employed, each being threaded as at 34 and having a rather short flat bearing surface 35 to press against the conical surface 27 of the output shaft. When adjusted, the screws are secured in place by lock-nuts 37. The outer end of the screw 33 may be fashioned with a simple kerf to receive a screw driver but preferably is formed with a central indentation 38 to receive a special screw driver of the Allen or Phillips type. The outside of the screw beyond the lock-nut is made to receive a wrench, for example, by having a hexagonal head as at 40.

Figure 3:
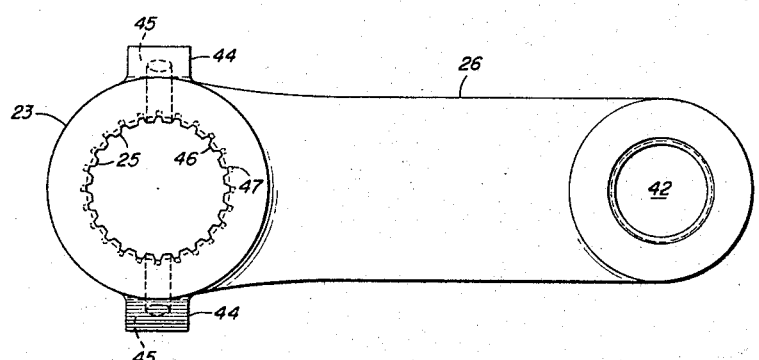
FIGURE 3 is a side elevation of the pitman arm.

In FIGURE 3 the pitman arm has a tapered opening 42 to receive the usual ball 30 which is riveted over in conventional manner as at 43. The hub 23 has a plurality of oppositely directed bosses 44 so as to provide flat faces 45 to be engaged by the lock-nuts 37. The outer end of the opening to receive the output shaft is shown at 46 and the inner end of the opening is indicated by the dotted lines 47.

What I claim is:
1. The combination in a joint suitable for modern vehicles of great horse power and subject to heavy torque and continued reversing, of
   (A) a shaft having at one end a circumferential series of longitudinally disposed tapered involute splines,
   (B) a member mounted on said shaft to turn therewith and having a tapered socket provided with a circumferential series of longitudinally tapered involute grooves receiving said splines, and
   (C) means for causing relative axial movement between the member on the shaft and the shaft, in which the shaft has an annular V-shaped groove forming a portion of the means for causing relative axial movement and in which the member mounted on the shaft has a pair of diametrically opposed bosses on its outer periphery with the end of each boss being an end surface substantially parallel to one side of the V-shaped groove and each boss having a threaded bore extending toward the end of the shaft through its boss and a screw in each bore having an end in contact with one side of the V-shaped groove with the other end of the screw extending past the end surface of the boss, and means for locking each screw in adjusted position.

2. The combination of claim 1 in which said locking means includes a lock nut engaging a screw and an end surface of each boss whereby to prevent removal of the shaft mounted member from the end of the shaft and to allow adjustment of the screw from time to time to force the splines and grooves firmly together to overcome the wear on the sides or flanks of the splined portions.

References Cited

UNITED STATES PATENTS

| | | | |
|---|---|---|---|
| 648,352 | 4/1900 | Blanton | 287—53 |
| 1,136,557 | 4/1915 | Ross | 287—53 |
| 1,541,007 | 6/1925 | Thiemer | 287—53 |
| 1,940,455 | 12/1933 | Kilpela | 287—52.08 X |
| 2,015,430 | 9/1935 | Matthews et al. | |
| 2,089,168 | 8/1937 | Brown | 287—52.05 |
| 2,443,688 | 6/1948 | McFarland | 287—53 |
| 2,629,616 | 2/1953 | McVey | 287—52.08 |
| 3,017,657 | 1/1962 | Mills | 287—52.08 X |

CARL W. TOMLIN, *Primary Examiner.*

EDWARD C. ALLEN, *Examiner.*

A. V. KUNDRAT, *Assistant Examiner.*